US011610397B2

(12) United States Patent
Ulbricht et al.

(10) Patent No.: US 11,610,397 B2
(45) Date of Patent: *Mar. 21, 2023

(54) PLANE DETECTION USING SEMANTIC SEGMENTATION

(71) Applicant: Apple Inc., Cupertino, CA (US)

(72) Inventors: Daniel Ulbricht, Sunnyvale, CA (US); Angela Blechschmidt, San Jose, CA (US); Mohammad Haris Baig, San Jose, CA (US); Tanmay Batra, Mountain View, CA (US); Eshan Verma, Mountain View, CA (US); Amit Kumar KC, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,469

(22) Filed: Sep. 13, 2021

(65) Prior Publication Data

US 2021/0406541 A1    Dec. 30, 2021

Related U.S. Application Data

(63) Continuation of application No. 17/032,213, filed on Sep. 25, 2020, now Pat. No. 11,132,546, which is a
(Continued)

(51) Int. Cl.
*G06V 20/10* (2022.01)
*G06T 7/70* (2017.01)
(Continued)

(52) U.S. Cl.
CPC ........... *G06V 20/10* (2022.01); *G06K 9/6267* (2013.01); *G06T 7/70* (2017.01); *G06T 19/006* (2013.01);
(Continued)

(58) Field of Classification Search
CPC ...... G06V 20/10; G06V 30/274; G06V 10/94; G06V 10/82; G06V 20/20;
(Continued)

(56) References Cited

U.S. PATENT DOCUMENTS 10,824,864 B2 *  11/2020  Ulbricht ............... G06V 30/274
11,132,546 B2 *   9/2021  Ulbricht ............... G06V 30/274
(Continued)

OTHER PUBLICATIONS

Amit Kumar K.C. et al., Demo: Spatio-temporal template matching for ball detection, 2011, 2011 Fifth ACM/IEEE International Conference on Distributed Smart Cameras, Aug. 2011, pp. 1-2. (Year: 2011).*

(Continued)

*Primary Examiner* — Jeffery A Brier
(74) *Attorney, Agent, or Firm* — Fernando & Partners, LLP

(57) ABSTRACT

In one implementation, a method of generating a plane hypothesis is performed by a device including one or more processors, non-transitory memory, and a scene camera. The method includes obtaining an image of a scene including a plurality of pixels. The method includes obtaining a plurality of points of a point cloud based on the image of the scene. The method includes obtaining an object classification set based on the image of the scene. Each element of the object classification set includes a plurality of pixels respectively associated with a corresponding object in the scene. The method includes detecting a plane within the scene by identifying a subset of the plurality of points of the point cloud that correspond to a particular element of the object classification set.

20 Claims, 6 Drawing Sheets

Related U.S. Application Data continuation of application No. 16/360,732, filed on Mar. 21, 2019, now Pat. No. 10,824,864.

(60) Provisional application No. 62/689,474, filed on Jun. 25, 2018.

(51) Int. Cl.
  *G06V 30/262* (2022.01)
  *G06K 9/62* (2022.01)
  *G06T 19/00* (2011.01)

(52) U.S. Cl.
  CPC ........ *G06V 30/274* (2022.01); *G06T 2200/24* (2013.01); *G06T 2207/10028* (2013.01); *G06T 2207/20084* (2013.01)

(58) Field of Classification Search
  CPC ........... G06V 30/19173; G06K 9/6267; G06K 9/6268; G06T 7/70; G06T 19/006; G06T 2200/24; G06T 2207/10028; G06T 2207/20084
  See application file for complete search history.

(56) References Cited

U.S. PATENT DOCUMENTS

| | | |
|---|---|---|
| 2010/0302247 A1 | 12/2010 | Perez et al. |
| 2011/0025689 A1 | 2/2011 | Perez et al. |
| 2016/0162742 A1 | 6/2016 | Rogan |
| 2017/0039731 A1 | 2/2017 | Liu et al. |
| 2017/0314930 A1 | 11/2017 | Monterroza et al. |
| 2018/0365898 A1 | 12/2018 | Costa |
| 2019/0355169 A1 | 11/2019 | Sapienza et al. |

OTHER PUBLICATIONS

Michael Ying Yang and Wolfgang Förstner, Plane Detection in Point Cloud Data, 2010, In Proceedings of the 2nd intconfon machine control guidance, Bonn, vol. 1, pp. 95-104. (Year: 2010).*

Xu-Feng Xing et al., "A Knowledge Base for Automatic Feature Recognition from Point Clouds in an Urban Scene", ISPRS Int. J. Geo-Inf. 2018, 7, 28; doi:10.3390/ijgi7010028; Jan. 16, 2018, pp. 1-27.

* cited by examiner

PLANE DETECTION USING SEMANTIC SEGMENTATION

CROSS-REFERENCE TO RELATED APPLICATIONS

This application is a continuation of U.S. Non-Provisional patent application Ser. No. 17/032,213, filed on Sep. 25, 2020, which is a continuation of U.S. Non-Provisional patent application Ser. No. 16/360,732, filed on Mar. 21, 2019, which claims priority to U.S. Provisional Patent App. No. 62/689,474, filed on Jun. 25, 2018, all of which are hereby incorporated by reference in their entireties.

TECHNICAL FIELD

The present disclosure generally relates to plane detection, and in particular, to systems, methods, and devices for plane detection based on semantic segmentations.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Placing CGR objects in an unmapped or dynamic scene presents a challenge from at least a user experience perspective. If a CGR object is placed within a scene without a suitable virtual substrate, the CGR object may not be anchored to a real-world surface in the scene. As such, the CGR object may float in mid-air, occlude a real-world object, or collide with a real-world object. This produces a poor user experience that is neither lifelike nor believable. Accordingly, in various implementations, this challenge is solved by detecting planes within the scene and determining their extents in order to provide virtual substrates on which to place CGR objects.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
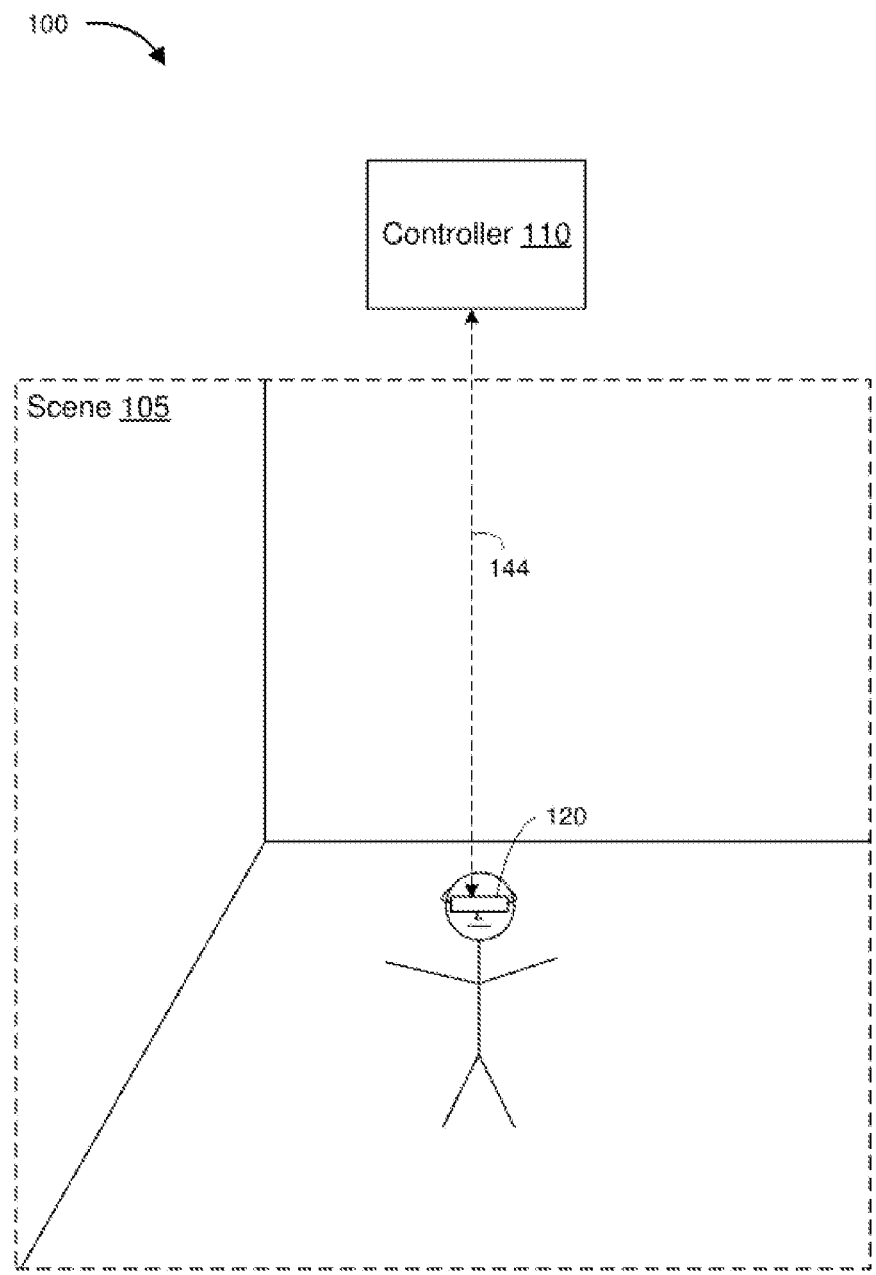
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for scene camera retargeting. In various implementations, the method is performed at an HMD including one or more processors, non-transitory memory, and a scene camera. The method includes obtaining an image of a scene including a plurality of pixels and obtaining a point cloud based on the image of the scene. The method includes generating an object classification set based on the image of the scene, each element of the object classification set including a respective plurality of pixels classified as a respective object in the scene. The method includes generating a plane hypothesis based on the point cloud and the object classification set.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In order to allow a user to place CGR objects in a CGR environment, the scene is mapped to produce a number of plane hypotheses generally describing real-world surfaces upon which CGR objects can be placed. Scene mapping can be time-consuming and/or computationally expensive. In order to reduce the complexity of the problem, additional information from semantic segmentation, which classifies pixels of an image of the scene as belong to various objects, is used to assist in plane detection.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the CGR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 provides a CGR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
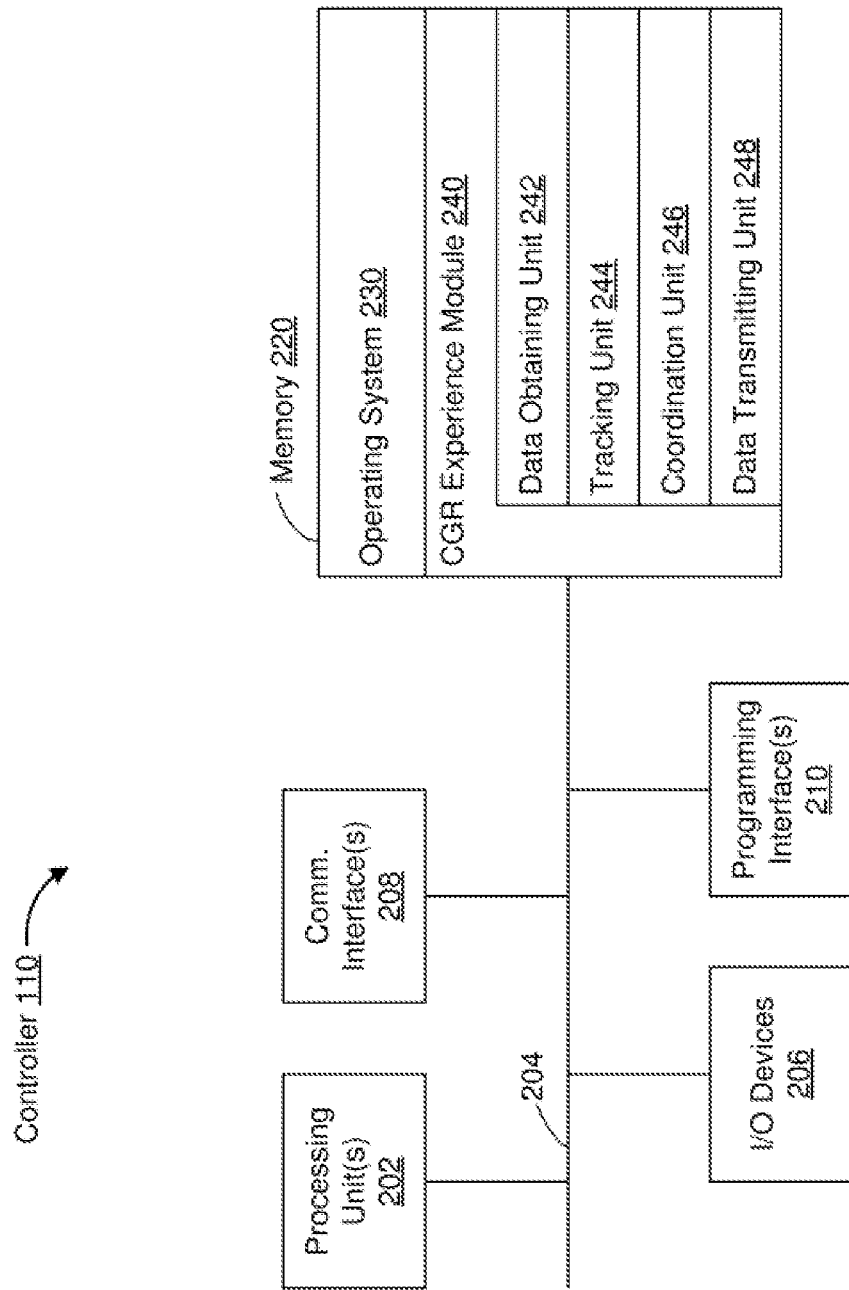
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
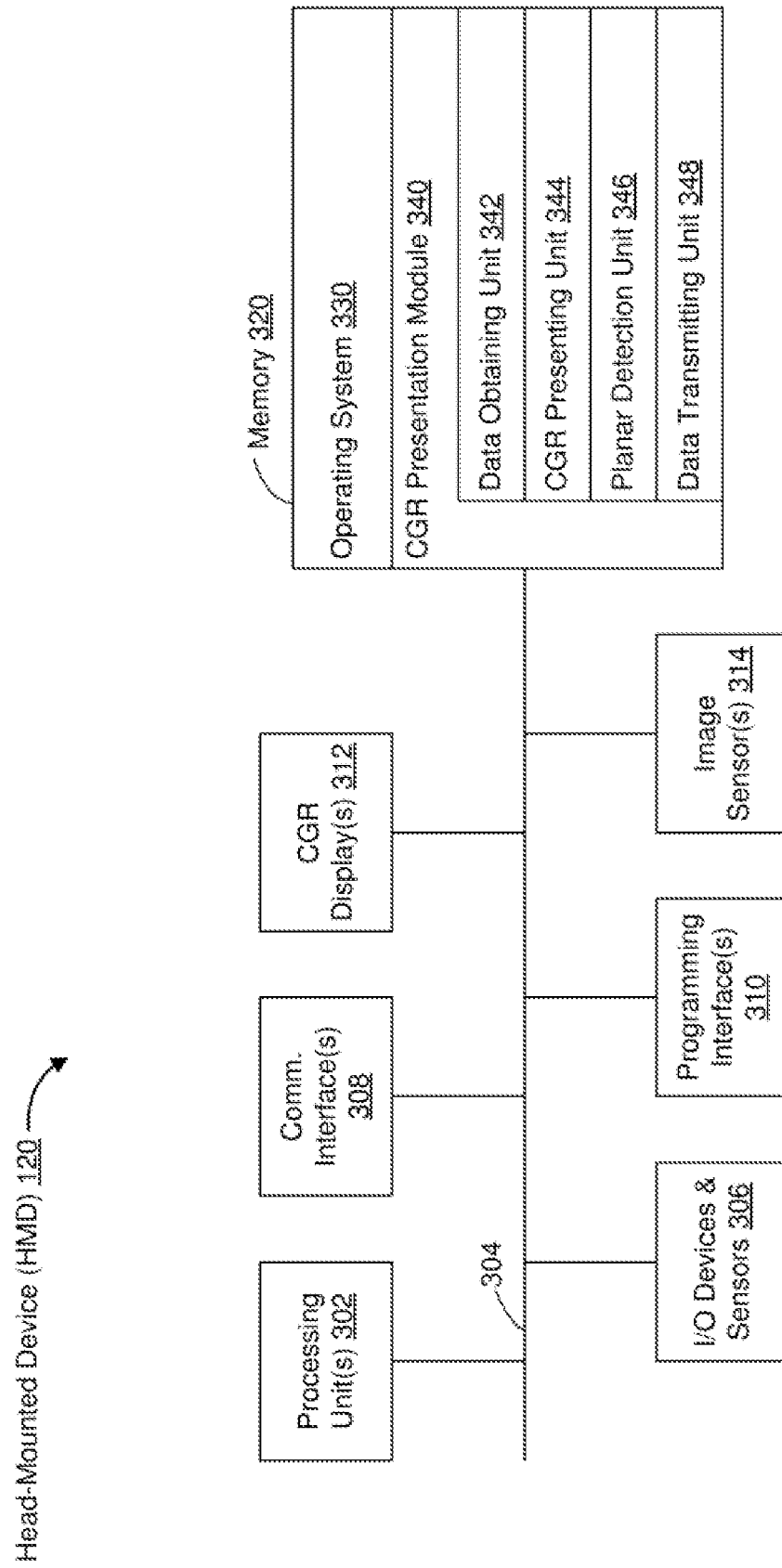
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting AR and VR content. In some implementations, the one or more CGR displays 312 are capable of presenting AR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, a planar detection unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. To that end, in various implementations, the CGR presenting unit 344 includes instructions and/or logic therefor, and heuristics and metadata therefor.

In some implementations, the planar detection unit 346 is configured to generate one or more planar hypotheses based on one or more images of the scene (e.g., captured using a scene camera of the one or more image sensors 314). To that end, in various implementations, the planar detection unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR presenting unit 344, the planar detection unit 346, and the data transmitting unit 348 are shown as residing on a single device (e.g., the HMD 120), it should be understood that in other implementations, any combination of the data obtaining unit 342, the CGR presenting unit 344, the planar detection unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
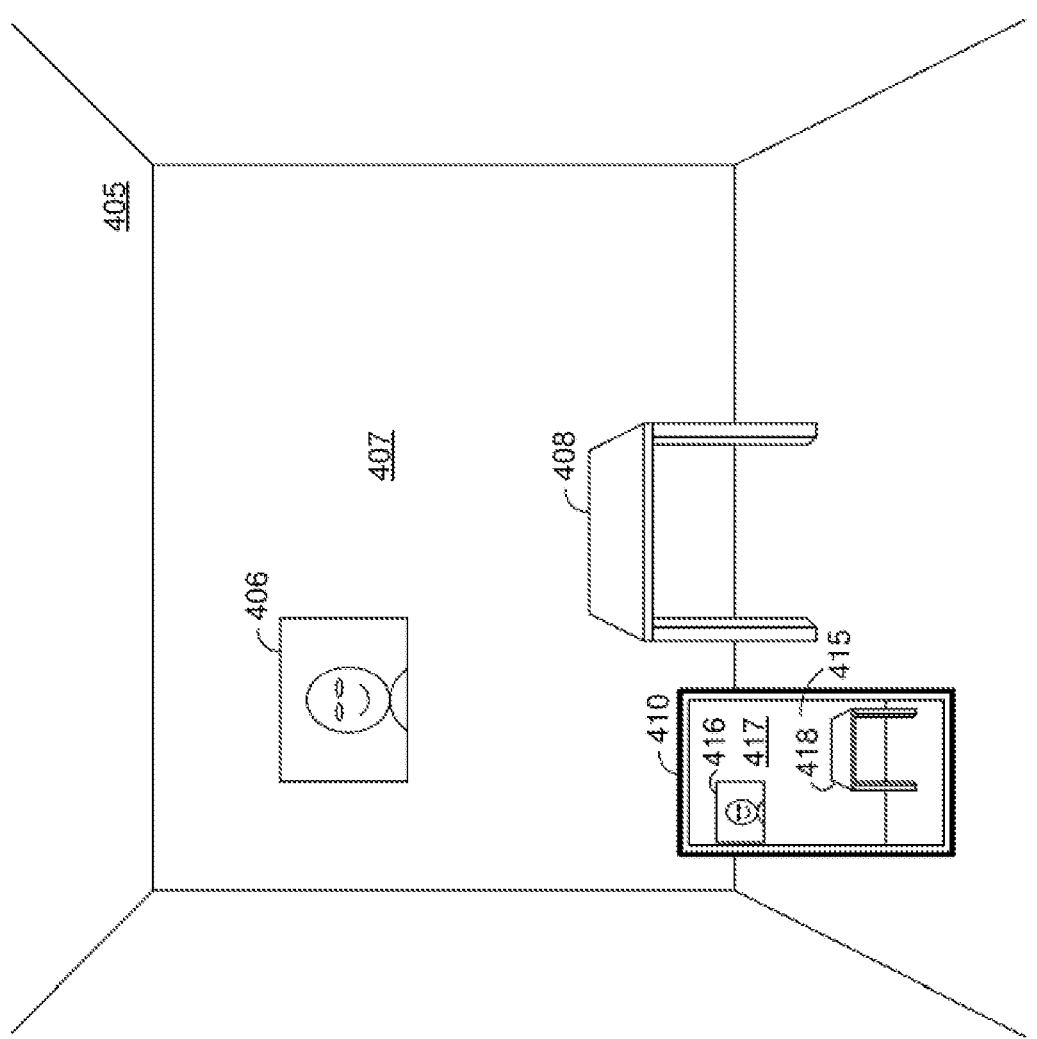
FIG. 4 illustrates a scene with a handheld electronic device surveying the scene.

FIG. 4 illustrates a scene 405 with a handheld electronic device 410 surveying the scene 405. The scene 405 includes a picture 406 hanging on a wall 407 and a table 408.

The handheld electronic device 410 displays a representation of the scene 415 including a representation of the picture 416 hanging on a representation of the wall 417 and a representation of the table 418. In surveying the scene 405, the handheld electronic device 410 generates a map of the scene 405 including a number of plane hypotheses in a CGR coordinate system. Each of the plane hypotheses defines a planar region in the CGR coordinate system and can be specified in any of number of ways. For example, in various implementations, a plane hypothesis includes a plane equation or corresponding coefficients. In various implementations, a plane hypotheses includes an indication of the bounds of the plane, e.g., the extent of the plane in the CGR coordinate system. Each of the plane hypotheses corresponds to a planar surface of the scene 405, such as the wall 407, a floor, or a top of the table 408.

In various implementations, the handheld electronic device 410 generates a plane hypothesis based on a point cloud and an object classification set. In various implementations, the point cloud is based on an image of the scene including a plurality of pixels (e.g., a matrix of pixels) obtained by a scene camera. In various implementations, the point cloud includes a plurality of three-dimensional points in the CGR coordinate system. In various implementations, the CGR coordinate system is gravity-aligned such that one of the coordinates (e.g., the z-coordinate) extends opposite the direction of a gravity vector. The gravity vector may be obtained by an accelerometer of the handheld electronic device 410. Each point in the point cloud represents a point on a surface of the scene 405, such as a point on the wall 407, the floor, or the table 408. In various implementations, the point cloud is obtained using VIO (visual inertial odometry) and/or a depth sensor. In various implementations, the point cloud is based on the image of the scene and previous images of the scene 405 taken at different angles to provide stereoscopic imaging. In various implementations, a point in the point cloud is associated with metadata, such as a color, texture, reflectance, or transmittance of the point on the surface in the scene or a confidence in the position of the point on the surface in the scene 405.

The handheld electronic device 410 can employ a variety of methods to determine a plane hypothesis (or multiple plane hypotheses) from the point cloud. For example, in various implementations, RANSAC (random sample consensus) methods are used to generate a plane hypothesis based on the point cloud. In one RANSAC method, an iteration includes selecting three random points in the point cloud, determining a plane defined by the three random points, and determining the number of points in the point cloud within a preset distance (e.g., 1 cm) of the plane. That number of points forms a score (or confidence) for the plane and after a number of iterations, the plane with the highest score is selected for generation of a plane hypothesis. With the points on that plane detected removed from the point cloud, the method can be repeated to detect another plane. In various implementations, the handheld electronic device 410 employs other methods of determining a plane hypothesis, such as those described in related applications U.S. Provisional Patent App. No. 62/620,971, filed on Jan. 23, 2018, hereby incorporated by reference in its entirety.

Based on the orientation of the handheld electronic device 410, various points in the point cloud correspond to various respective pixels of the image of the scene 405 as surveyed by the handheld electronic device 410.

In various implementations, the object classification set is based on the image of the scene 405. The object classification set includes one or more elements, each element including a respective subset of the plurality of pixels (of the image of the scene) classified as a respective object in the scene. In various implementations, the object classification set is generated based on semantic segmentation. In various implementations, the object classification set is generated using a neural network applied to the image of the scene. In various implementations, an element of the object classification set includes a label indicating the object in the scene corresponding to the element, e.g., the wall 407, the floor, or the table 408.

Figure 5:
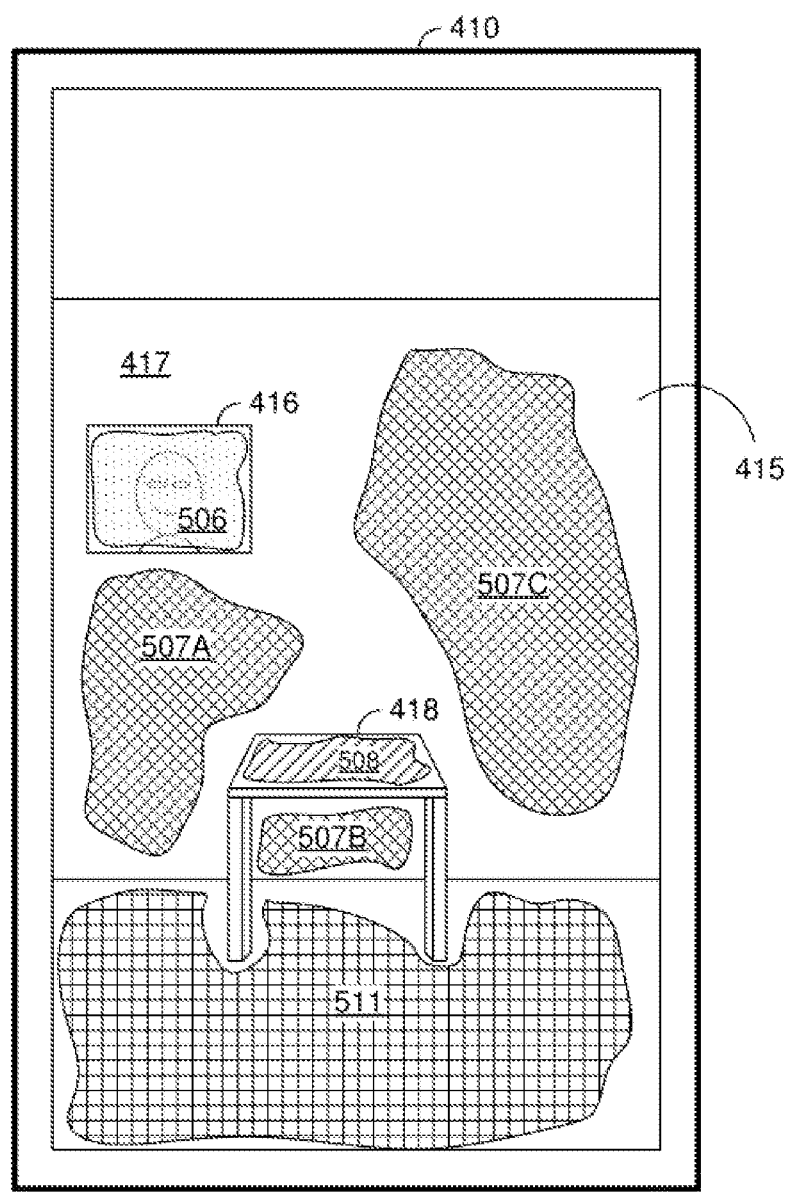
FIG. 5 illustrates the handheld electronic device surveying the scene of FIG. 4.

FIG. 5 illustrates the handheld electronic device 410 surveying the scene 405 of FIG. 4. In FIG. 5, the representation of the scene 415 is displayed with different elements (respective subsets of the plurality of pixels) colored with different colors. In FIG. 5, the object classification set includes four elements, a first element 506 including a subset of the plurality of pixels corresponding to the representation of the picture 416, a second element 507A-507C including a (non-contiguous) subset of the plurality of pixels corresponding to the representation of the wall 417, a third element 508 including a subset of the plurality of pixels corresponding to the representation of the top of the table 418, and a fourth element 511 including a subset of the plurality of pixels corresponding to the representation of the floor.

In various implementations, the object classification set assists the handheld electronic device 410 in determining a plane hypothesis in a variety of ways. In various implementations, the handheld electronic device 410 uses the object classification set to reduce the number of points in the point cloud used in a plane detection method (e.g., RANSAC), thereby improving computational efficiency. For example, the handheld electronic device 410 identifies a subset of the points of the point cloud corresponding to pixels of a particular element of the object classification set (e.g., a subset of the points of the point cloud corresponding to the pixels illustrated by the third element 508) and performs a RANSAC plane detection algorithm using only those points, which is likely to converge much more rapidly than by additionally using points from other surfaces.

In various implementations, the handheld electronic device 410 uses the object classification set to modify a plane hypothesis generated based on the point cloud. For example, the handheld electronic device 410 generates a first plane hypotheses based on the point cloud, the first plane hypothesis having a boundary. The first plane hypothesis includes a subset of the points of the point cloud that lie within a set distance of a plane. In various implementations, the subset of points of the point cloud include points that correspond to pixels of the image in two different elements of the object classification set. Accordingly, in various implementations, the handheld electronic device 410 can split the first plane hypothesis into two (or more) plane hypotheses, each associated with points in the subset of the points of the point cloud that correspond to respective elements of the object classification set. Further, in various implementations, the handheld electronic device 410 can decrease a confidence (or other score) of the first plane hypothesis. In various implementations, the subset of points of the point cloud correspond to pixels in the image that correspond to a particular element of the object classification set, but fails to include one or more points in the point cloud that correspond to pixels of the image of that particular element. Accordingly, in various implementations, the handheld electronic device 410 can grow the first plane hypothesis (e.g., increase the boundary) to include points in the point cloud that correspond to pixels of the image of that particular element. In this way, a plane hypothesis is expanded using a single image as compared to other systems which expand plane hypotheses using temporally sequential images. Further, in various implementations, the handheld electronic device 410 can increase a confidence (or other score) of the first plane hypothesis.

In various implementations, the handheld electronic device 410 uses object classification set to label a plane hypothesis. For example, the handheld electronic device 410 generates a plane hypotheses based on the point cloud. In various implementations, the subset of points of the point cloud correspond to pixels in the image that correspond to a particular element of the object classification set having a particular label. Accordingly, the handheld electronic device 410 can modify the plane hypothesis to include the particular label. A labeled plane provides for a number of different use cases for the handheld electronic device 410. In various implementations, particular CGR objects can only be placed in the CGR environment on plane hypotheses with a particular label. For example, in various implementations, a CGR vase can only be placed on a plane hypothesis labeled as table top, a CGR picture can only be placed on a plane hypothesis labeled as a wall, or a CGR piece of furniture can only be placed on a plane hypothesis labeled as floor.

Figure 6:
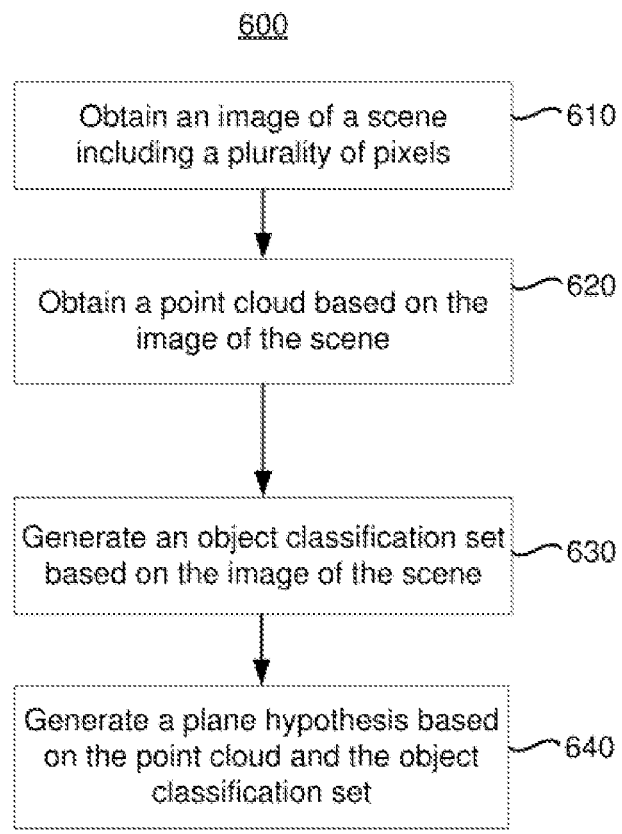
FIG. 6 is a flowchart representation of a method of generating a plane hypothesis in accordance with some implementations.

FIG. 6 is a flowchart representation of a method 600 of generating a plane hypothesis in accordance with some implementations. In various implementations, the method 600 is performed by a device with one or more processors, non-transitory memory, and a scene camera (e.g., the HMD 120 FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory). Briefly, in some circumstances, the method 600 includes: obtaining an image of a scene including a plurality of pixels; obtaining a point cloud based on the image of the scene and an object classification set based on the image of the scene, and generating a plane hypothesis based on the point cloud and the object classification set.

The method 600 begins, in block 610, with the device obtaining an image of a scene including a plurality of pixels. In various implementations, the device captures the image of the scene using a scene camera.

The method 600 continues, at block 620, with the device obtaining a point cloud based on the image of the scene. In various implementations, the point cloud includes a plurality of three-dimensional points in a CGR coordinate system. In various implementations, the CGR coordinate system is gravity-aligned such that one of the coordinates (e.g., the z-coordinate) extends opposite the direction of a gravity vector. The gravity vector may be obtained by an accelerometer of the device. In various implementations, the point cloud is obtained using VIO (visual inertial odometry) and/or a depth sensor. In various implementations, the point cloud is based on the image of the scene and previous images of the scene taken at different angles to provide stereoscopic imaging. In various implementations, a point in the point cloud is associated with metadata, such as a color, texture, reflectance, or transmittance of the point on the surface in the scene or a confidence in the position of the point on the surface in the scene.

The method 600 continues, at block 630, with the device generating an object classification set based on the image of the scene. Each element of the object classification set includes a respective plurality of pixels classified as a respective object in the scene. In various implementations, the object classification set is generated based on semantic segmentation. In various implementations, the object classification set is generated using a neural network applied to the image of the scene. In various implementations, an element of the object classification set includes a label indicating the object in the scene corresponding to the element, e.g., a wall, a floor, or a table.

The method 600 continues, at block 640, with the device generating a plane hypothesis based on the point cloud and the object classification set. In various implementations, the device generates the plane hypothesis by determining a subset of points of the point cloud corresponding to the respective plurality of pixels of a particular element of the object classification set and generating the plane hypothesis based on the subset of points of the point cloud. For example, in various implementations, the device applies a RANSAC plane detection algorithm to the subset of the points of the point cloud (and not other points of the point cloud).

In various implementations, generating the plane hypothesis includes generating a first plane hypothesis based on the point cloud (e.g., using a RANSAC plane detection algorithm). The device associates the first plane hypothesis with a particular element of the object classification set. For example, the device determines that most or all of the points of the point cloud correspond to pixels of the image in the particular element of the object classification set. The device determines a subset of points of the point cloud corresponding to the respective plurality of pixels of the particular element of the object classification set. The device updates the first plane hypothesis based on the subset of points of the point cloud (e.g., by expanding (or contracting) a boundary of the first plane hypothesis).

In various implementations, generating the plane hypothesis includes determining a confidence associated with the plane hypothesis based on the object classification set. For example, in various implementations, the device generates a first plane hypothesis based on the point cloud including a first confidence and, in response to determining that most or all of the points of the point cloud of the first plane hypothesis correspond to pixels of the image in a single element of the object classification set, the first confidence is increased.

In various implementations, the device obtains a second image of the scene including a second plurality of pixels (e.g., at a second, later time). The device obtains a second point cloud based on the image of the scene and generates a second object classification set based on the second image of the scene. The device updates the plane hypothesis based on the second point cloud and the second object classification set. For example, the device can update the plane to include points of the point cloud corresponding to a new location of an object, as indicated by the second object classification set, and remove points from the old location.

In various implementations, at least one element of the object classification set includes a label. Accordingly, in various implementations, the device associates the plane hypothesis with a label based on the object classification set.

In various implementations, the device associates the plane hypothesis with a particular element of the object classification set including a label. The device detects a user input that corresponds to association of a CGR object with the plane hypothesis. For example, the user can select an object from an object selection interface and move the object to be displayed proximate to the plane hypothesis in the CGR coordinate system. In response to the label of the particular element meeting a placement criteria, the device associates the CGR object with the plane hypothesis. In this way, certain object can only be placed in the CGR environment on particular types of surfaces.

In various implementations, the device associates the plane hypothesis with a particular element of the object classification set including a label. In response to the label of the particular element meeting a modification criteria, the device displays a CGR object at the location of the plane hypothesis. In this way, certain surfaces can be modified based on the labeling, e.g., by changing the floor to lava or the ceiling to a sky.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   obtaining an image of a scene including a plurality of pixels;
   obtaining a plurality of points of a point cloud based on the image of the scene;
   obtaining an object classification set based on the image of the scene, wherein each element of the object classification set includes a plurality of pixels respectively associated with a corresponding object in the scene; and detecting a plane within the scene by identifying a subset of the plurality of points of the point cloud that correspond to a particular element of the object classification set.

2. The method of claim 1, wherein each element of the object classification set is associated with a distinct object in the scene.

3. The method of claim 1, wherein obtaining the object classification set includes generating the object classification set via semantic segmentation, and wherein each element of the object classification set includes a semantic label associated with a corresponding object in the scene.

4. The method of claim 1, wherein detecting the plane includes generating a plane hypothesis based on the point cloud and the object classification set.

5. The method of claim 4, wherein generating the plane hypothesis includes:

generating a first plane hypothesis based on the point cloud;

associating the first plane hypothesis with the particular element of the object classification set;

identifying the subset of the plurality of points of the point cloud based on pixels of the particular element of the object classification set;

updating the first plane hypothesis based on the subset of points of the point cloud.

6. The method of claim 4, wherein generating the plane hypothesis includes:

determining an initial confidence score associated with the plane hypothesis based on the object classification set;

in accordance with a determination that a number of the subset of the plurality of points is greater than a threshold number, generating an increased confidence score associated with the plane hypothesis that is greater than the initial confidence score; and in accordance with a determination that the number of the subset of the plurality of points is less than the threshold number, generating a decreased confidence score associated with the plane hypothesis that is less than the initial confidence score.

7. The method of claim 4, wherein generating the plane hypothesis includes:

determining an initial confidence score associated with the plane hypothesis based on the object classification set;

in accordance with a determination that a number of the subset of the plurality of points is greater than a threshold number, generating an increased confidence score associated with the plane hypothesis that is greater than the initial confidence score; and in accordance with a determination that the number of the subset of the plurality of points is less than the threshold number, generating a decreased confidence score associated with the plane hypothesis that is less than the initial confidence score.

8. The method of claim 4, wherein generating the plane hypothesis includes:

applying a random sample consensus (RANSAC) plane detection algorithm to the subset of the plurality of points of the point cloud; and foregoing applying the RANSAC plane detection algorithm to a remainder subset of the plurality of points of the point cloud, wherein each of the remainder subset of the plurality of points is not included in the subset of the plurality of points of the point cloud.

9. The method of claim 1, wherein obtaining the plurality of points of the point cloud is based on VIO (visual inertial odometry) and/or data from a depth sensor.

10. The method of claim 1, wherein obtaining the object classification set includes generating the object classification set by applying a neural network to the image of the scene.

11. A device comprising:

a scene camera to obtain an image of a scene including a plurality of pixels; and one or more processors to:

obtain a plurality of points of a point cloud based on the image of the scene;

obtain an object classification set based on the image of the scene, wherein each element of the object classification set includes a plurality of pixels respectively associated with a corresponding object in the scene; and detect a plane within the scene by identifying a subset of the plurality of points of the point cloud that correspond to a particular element of the object classification set.

12. The device of claim 11, wherein each element of the object classification set is associated with a distinct object in the scene.

13. The device of claim 11, wherein obtaining the object classification set includes generating, via the one or more processors, the object classification set via semantic segmentation, and wherein each element of the object classification set includes a semantic label associated with a corresponding object in the scene.

14. The device of claim 11, wherein detecting the plane includes generating, via the one or more processors, a plane hypothesis based on the point cloud and the object classification set.

15. The device of claim 14, wherein generating the plane hypothesis includes:

generating a first plane hypothesis based on the point cloud;

associating the first plane hypothesis with the particular element of the object classification set;

identifying the subset of the plurality of points of the point cloud based on pixels of the particular element of the object classification set;

updating the first plane hypothesis based on the subset of points of the point cloud.

16. The device of claim 14, wherein generating the plane hypothesis includes:

determining an initial confidence score associated with the plane hypothesis based on the object classification set;

in accordance with a determination that a number of the subset of the plurality of points is greater than a threshold number, generating an increased confidence score associated with the plane hypothesis that is greater than the initial confidence score; and in accordance with a determination that the number of the subset of the plurality of points is less than the threshold number, generating a decreased confidence score associated with the plane hypothesis that is less than the initial confidence score.

17. The device of claim 14, wherein generating the plane hypothesis includes:

determining an initial confidence score associated with the plane hypothesis based on the object classification set;

in accordance with a determination that a number of the subset of the plurality of points is greater than a threshold number, generating an increased confidence score associated with the plane hypothesis that is greater than the initial confidence score; and in accordance with a determination that the number of the subset of the plurality of points is less than the threshold number, generating a decreased confidence score associated with the plane hypothesis that is less than the initial confidence score.

18. The device of claim 14, wherein generating the plane hypothesis includes:

applying a random sample consensus (RANSAC) plane detection algorithm to the subset of the points of the point cloud; and foregoing applying the RANSAC plane detection algorithm to the remaining points of the plurality of points of the point cloud.

19. The device of claim 11, wherein obtaining the object classification set includes generating, via the or more processors, the object classification set by applying a neural network to the image of the scene.

20. A non-transitory memory storing one or more programs, which, when executed by one or more processors of a device with one or more scene cameras, cause the device to perform operations comprising:

obtaining an image of a scene including a plurality of pixels;

obtaining a plurality of points of a point cloud based on the image of the scene;

obtaining an object classification set based on the image of the scene, wherein each element of the object classification set includes a plurality of pixels respectively associated with a corresponding object in the scene; and detecting a plane within the scene by identifying a subset of the plurality of points of the point cloud that correspond to a particular element of the object classification set.

* * * * *